United States Patent [19]
Ikekame et al.

[11] Patent Number: 6,134,126
[45] Date of Patent: Oct. 17, 2000

[54] POWER CONVERSION SYSTEM

[75] Inventors: Hiroo Ikekame, Tokyo; Katsumi Fukasawa, Inagi; Dai Karasawa, Kawasaki, all of Japan

[73] Assignee: Kabushiki Kaisha Toshiba, Kawasaki, Japan

[21] Appl. No.: 09/391,659

[22] Filed: Sep. 7, 1999

[30] Foreign Application Priority Data

Sep. 8, 1998 [JP] Japan .................................. 10-254000
Feb. 17, 1999 [JP] Japan .................................. 11-038575

[51] Int. Cl.[7] ...................................................... H02M 1/12
[52] U.S. Cl. ................................ 363/39; 363/37; 307/105
[58] Field of Search .................................. 363/34, 37, 39, 363/40, 44; 307/105; 323/212, 215

[56] References Cited

U.S. PATENT DOCUMENTS 5,677,832 10/1997 Tissier et al. ............................... 363/41
5,831,842 11/1998 Ogasawara et al. ....................... 363/40
5,914,540 6/1999 Larsen ..................................... 363/39 X

FOREIGN PATENT DOCUMENTS 9-266677 10/1997 Japan .

*Primary Examiner*—Jessica Han
*Attorney, Agent, or Firm*—Finnegan, Henderson, Farabow, Garrett & Dunner, L.L.P.

[57] ABSTRACT

A power conversion system always keeps a constant voltage level relative to the ground potential and shows an improved controllability for the noise compensation current. In the noise reduction circuit of the system, a rectified DC voltage is applied to the positive side output line and the negative side output line. The DC voltage is divided by a pair of capacitors connected in series with the intermediary point held to the ground potential. Thus, the positive side output line can always supply a positive voltage that is held to a constant level relative to the ground potential. Similarly, the negative side output line can always supply a negative voltage that is held to a constant level relative to the ground potential. Additionally, as the transistors are controlled for on/off operations by the amplifier, the noise compensation current flows through the noise reduction circuit between the input grounding terminal of the full-wave rectifier and the ground.

12 Claims, 16 Drawing Sheets

POWER CONVERSION SYSTEM

BACKGROUND OF THE INVENTION

This invention relates to a power conversion system comprising a noise reduction circuit adapted to flow a noise compensation current in order to cancel the leakage current when driving an electric motor at variable speed.

Electric motors have a wide variety of applications including elevators, rolling mills and automobiles. They normally comprise a power converter to make the electric motor adapted to supply power at a desired rate. Typical power converters comprise an inverter formed by arranging a plurality of switching devices such as GTOs (gate turn-off thyristors) and IGBTs (insulated gate bipolar transistors) both in series and in parallel. The arrangement using an inverter will be described hereinafter as a typical arrangement for realizing power converters.

In recent years, electric motor drive systems using an inverter of the above identified type are drawing attention because of the problem of ground leakage current (to be referred to simple as leakage current hereinafter) that arises when each switching element of the system is used for high speed switching operations.

FIG. 1 is a schematic circuit diagram of a power conversion system and its peripheral arrangement illustrating this problem. In the drive system of this electric motor, a 3-phase AC voltage is applied to full-wave rectifier 2 from an AC power source.

The full-wave rectifier 2 comprises diodes D1 through D6 that are connected to show 3-phase bridge connection. The 3-phase AC voltage from the AC power source is transformed into a DC voltage, which is then supplied to inverter 3 through between positive side input line P and negative side input line N. Note that the full-wave rectifier 2 and the inverter 3 constitute a power converter.

The inverter 3 comprises switching elements Q1 through Q6 connected for 3-phase bridge connection and applies a pulse-shaped (rectangular wave) voltage with a limited width to each of the winding terminals of the electric motor 4 for three phases under the control of a gate drive circuit (not shown) that operates for PWM (pulse width modulation) control. Thus, the electric motor 4 is driven by the pulse-shaped voltage.

However, the electric motor 4 has a floating capacitance C that appears between itself and the ground. Therefore, as each of the switching elements Q1 through Q6 is turned on/off and a pulse-shaped voltage is applied to the electric motor 4, a pulse-like voltage will be applied between the related terminal of the electric motor 4 and the ground.

Then, a leakage current I1 that is a noise current flows to the ground through the floating capacitance C between each of the windings of the electric motor and the frame ground as a function of the rate-of-change of the voltage dv/dt.

The leakage current I1 flows through each of the grounding lines between the electric motor 4 and the grounding terminal of the AC power source 1 into or out of the latter depending on the polarity. The leakage current I1 can give rise to operation errors of the leakage breaker of the circuit and electric shocks to the operator.

In an attempt for avoiding problems due to such a leakage current I1, the use of a noise reduction circuit as shown in FIG. 2 has been proposed for power converters.

The noise reduction circuit comprises a leakage current detector 5 for detecting the leakage current, if any, flowing from the supply line between the AC power source 1 and the full-wave rectifier 2 and a noise reduction circuit 6 adapted to flow a noise compensation current by making the stretch between positive side input line P and the ground or between the ground and the negative side input line N electrically conductive depending on the detected leakage current.

The noise reduction circuit 6 comprises an amplifier 7, an npn-type transistor Tr1, a pnp-type transistor Tr2 and a coupling capacitor C1. The transistors Tr1, Tr2 are required to show a high withstand voltage and operate at a high frequency to produce a high current amplifying effect.

The leakage current detector 5 is typically a zero-phase current transformer CT having an annular core made of ferrite and adapted to equivalently detect the leakage current I1 flowing to the full-wave rectifier 2 on the basis of the difference in the power source current and send a detection signal to the amplifier 7.

Of the transistors Tr1, Tr2, the npn-type transistor Tr1 has its collector connected to the positive side input line P and its emitter connected to the emitter of the pnp-type transistor Tr2 and also to one of the opposite ends of the coupling capacitor C1. The pnp-type transistor Tr2 has its collector connected to the negative side input line N. The other end of the coupling capacitor C1 is connected to the ground.

Thus, upon receiving an output signal from the amplifier 7 at the base, one of the transistors Tr1, Tr2 turns on the other, while the latter turns off the former so that either the positive side input line P or the negative side input line N will be grounded by way of the coupling capacitor C1.

For example, when the leakage current I1 flowing from the electric motor 4 to the grounding line of the AC power source 1, the noise reduction circuit turns on only the pnp-type transistor Tr2.

Then, the noise compensation current i flows into the closed circuit consisting of the diode D4, D5 or D6 of the full-wave rectifier 2 by way of the negative side input line N, the pnp-type transistor Tr2 and the coupling capacitor C1.

Therefore, the leakage current I1 flowing into the grounding terminal of the AC power source 1 is cancelled by the noise compensation current i.

On the other hand, when the leakage current I1 flowing from the grounding line of the AC power source 1 to the electric motor 4, the noise reduction circuit turns on only the npn-type transistor Tr1.

Then, the noise compensation current i flows from the diode D1, D2 or D3 of the full-wave rectifier 2 to the grounding line by way of the positive side input line P, the npn-type transistor Tr1 and the coupling capacitor C1.

Therefore, the leakage current I1 flowing from the grounding line of the AC power source 1 to the electric motor 4 is cancelled by the noise compensation current i.

However, in the power converter having a configuration as described above, the positive side input line P of the full-wave rectifier 2 shows the ground potential when, for instance, the diodes D3 and D4 of the full-wave rectifier 2 are held in an electrically conductive state in the full-wave rectifier 2.

Then, if the npn-type transistor Tr1 is turned on, no noise compensation current i flows from the noise reduction circuit and noise becomes uncontrollable because the positive side input line P and the ground show no potential difference.

If, on the other hand, the devices D6 and D1 of the full-wave rectifier 2 are held in an electrically conductive state, the negative side input line N of the full-wave rectifier 2 shows the ground potential. Then, if the pnp-type transistor Tr2 is turned on, no noise compensation current i flows from the noise reduction circuit and noise becomes uncontrollable because the negative side input line N and the ground show no potential difference.

This problem arises also in the arrangement of FIG. 5 where a total of n sets A1 through An, each comprising a power converter of a full-wave rectifier 2 and a inverter 3 and an electric motor 4, are connected in series. In FIG. 5, only the set A1 is illustrated in detail because all the sets A1 through An are identical. The power conversion system of FIG. 5 is provided with noise reduction circuits as shown in FIG. 6 arranged for the respective power converters. However, the arrangement of FIG. 6 is not free from the problem of uncontrollability.

Additionally, the power conversion system of FIG. 6 has as many noise reduction circuits as the number of power converters to make it less adapted to down-sizing.

BRIEF SUMMARY OF THE INVENTION

Therefore, it is an object of the present invention to provide a power conversion system that can keep its potential to a constant level relative to the ground potential to improve the controllability of the noise compensation current.

Another object of the present invention is to provide a power conversion system comprising a plurality of power converters that can reduce the noise by means of a common noise reduction circuit the power converters are connected in series and, therefore adapted to down-sizing.

According to the invention, the above objects and other objects are achieved by providing a power conversion system comprising:

an AC power source;

a power converter for converting an AC power supplied from the AC power source into an AC power with a selected frequency in order to individually drive an electric motor; and a noise reduction circuit for detecting the leakage current from the supply line of the AC power source, if any, and flowing a noise compensation current to the supply line of the AC power source;

the noise reduction circuit having:

an insulating transformer having its primary side connected between the AC power source and the power converter;

a rectifying circuit connected to the secondary side of the insulating transformer;

positive side and negative side capacitors connected in series between the positive output line and the negative side output line of the rectifying circuit;

a connection means for connecting the serial connection point between the positive side and negative side capacitors to a grounded common AC input line arranged upstream relative to the power converter;

a positive side switching device having one of its end connected to the positive output line;

a negative side switching device having one of its ends connected to the negative side output line and having an ON/OFF characteristic opposite to that of the positive side switching device;

a coupling capacitor arranged between the other ends of the positive side and negative side switching devices and the ground; and a switching control means for amplifying the leakage current detection signal and applying the obtained amplified signal to the control inputs of the positive side and negative side switching devices.

With the above arrangement of the present invention, while a rectified DC voltage is applied to the positive output line and the negative side output line of the rectifying circuit, the intermediary DC connection point between the positive side capacitor and the negative side capacitor is held to the ground potential to divide the DC voltage.

Therefore, the positive side output line can constantly supply a positive constant voltage relative to the ground potential, while the negative side output line can constantly supply a negative constant voltage relative to the ground potential. Thus, a power conversion system according to the invention shows a remarkably improved controllability for the noise compensation current because the above supplied voltages can be held to a constant level relative to the ground potential.

Additionally, when the positive side and the negative side switching devices are turned on and off respectively under the control of the switching control means, a noise compensation current is made to flow to the grounded common AC input line of the power converter by way of the coupling capacitor, the positive side output line and the positive capacitor or the coupling capacitor, the negative side output line and the negative side capacitor. Therefore, the leakage current that is a noise current can be effectively cancelled and the noise can be reliably reduced without difficulty.

A power conversion system according to the invention and having the above described configuration may be modified to have a plurality of power converters connected in parallel. Then, the operation of extracting an AC voltage of the insulating transformer and that of flowing in/out a noise compensation current i of the noise reduction circuit are conducted relative to the common AC input line. Then, the connection points of the noise reduction circuit are excluded from the power converters and collectively arranged to the upstream thereof so that this arrangement provides an advantage of commonly using the noise reduction circuit in addition to the above identified noise reduction effect. In other words, the noise of driving the system can be reduced by means of a common noise reduction circuit to a great advantage of down-sizing the system.

The AC power source may have multi-phase power source sections and one of the multi-phase power source sections may be grounded.

For the purpose of the invention, the AC power source may be replaced by a star-connected AC power source having a grounded neutral point and three capacitors of the star-connection, each having one of its ends connected to the related 3-phase AC input line between the leakage current detector and the full-wave rectifier and the other end commonly connected to the neutral point. Then, the neutral point of the three capacitors is connected to the serial connection point of the positive side and negative side capacitors of the noise reduction circuit. Then, the neutral point of the star-connected capacitors is made to operate as virtual grounding point relative to the neutral point that is the grounding connection point of the star-connected AC power source.

With this arrangement, the voltage relative to the virtual grounding potential (the voltage relative to a potential of the virtual grounding point) can always be held to a constant level and the connection points of the noise reduction circuit are collectively arranged to the upstream of each of the power converters so that this arrangement provides an advantage of commonly using the noise reduction circuit for reducing the noise of driving the system if a plurality of power converters are connected in series to a great advantage of down-sizing the system.

Additionally, the controllability of the noise compensation current can be improved due to the advantage that the voltage relative to the virtual grounding potential can always be held to a constant level. Still additionally, the noise compensation current is made to flow to the AC input line by way of the neutral point of the capacitors of the star-connection exactly in a manner as described above. Therefore, the leakage current that is a noise current can be effectively cancelled and the noise can be reliably reduced without difficulty.

A power conversion system according to the invention may additionally comprise a leakage current detector arranged closer to the AC power source than the connection point of the connection means (or the capacitors of the star-connection) and the AC input line and adapted to equivalently detect the leakage current, if any, and input the obtained detection signal to the switch control means.

Then, since the leakage current detector is arranged closer to the AC power source than the connection point of the connection means (or the capacitors of the star-connection) and the AC input line, the leakage current, if any, is detected independently from the noise compensation current flowing to and from the connection point to further improve the reliability of operation.

Each of the positive side and the negative side switching devices may be made to have a plurality of switching elements which are electrically connected in parallel. If such is the case, since the both of the positive side and negative side switching elements that are electrically connected in parallel give rise to a large current capacity, the noise compensation current can be made large enough to satisfactorily cancel the leakage current if the latter shows a large value.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrated presently preferred embodiments of the present invention and, together with the general description given above and the detailed description of the preferred embodiments given below, serve to explain the principles of the present invention.

DETAILED DESCRIPTION OF THE INVENTION

Now, the present invention will be described in greater detail by referring to the accompanying drawings that illustrate preferred embodiments.

1st Embodiment

Figure 1:
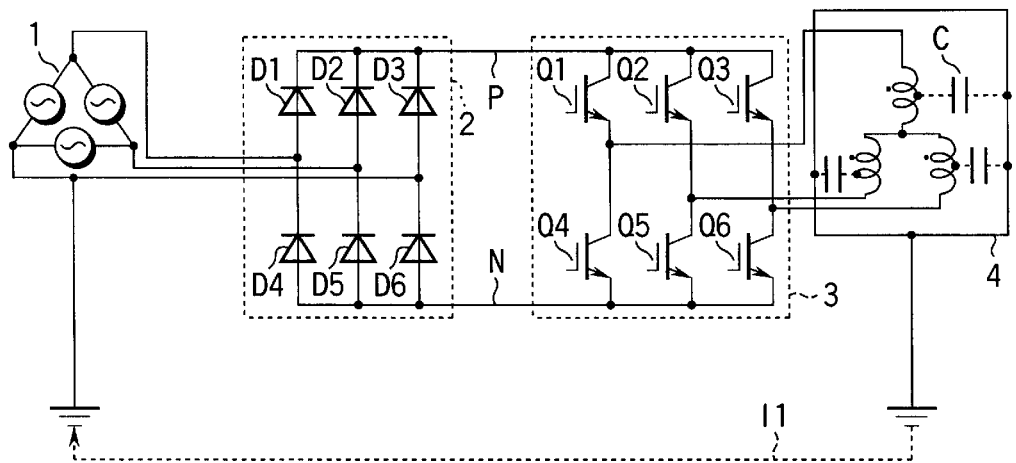
FIGS. 1 and 2 are schematic circuit diagrams of a known power conversion system and the peripheral arrangement.
Figure 2:
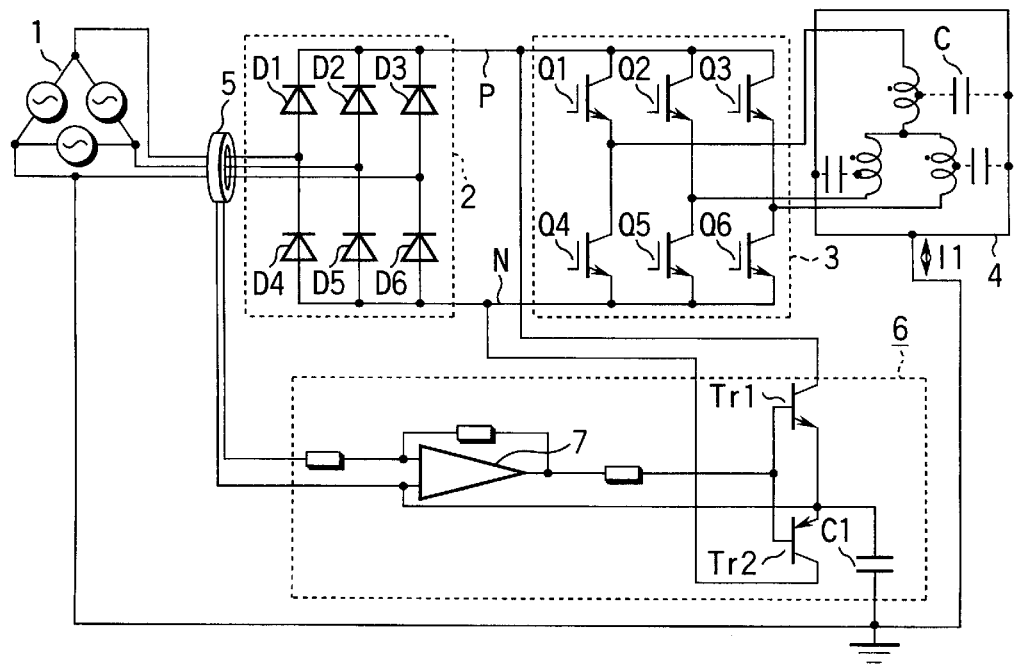
Figure 3:
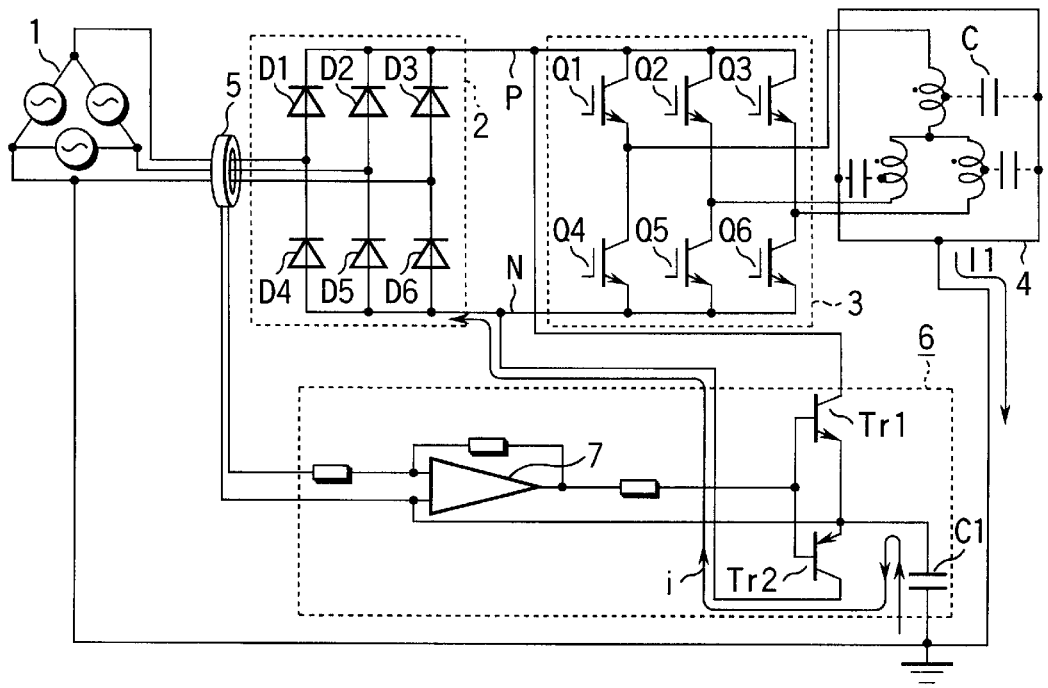
FIGS. 3 and 4 are schematic illustrations of the noise reducing operation of the known system of FIG. 2.
Figure 4:
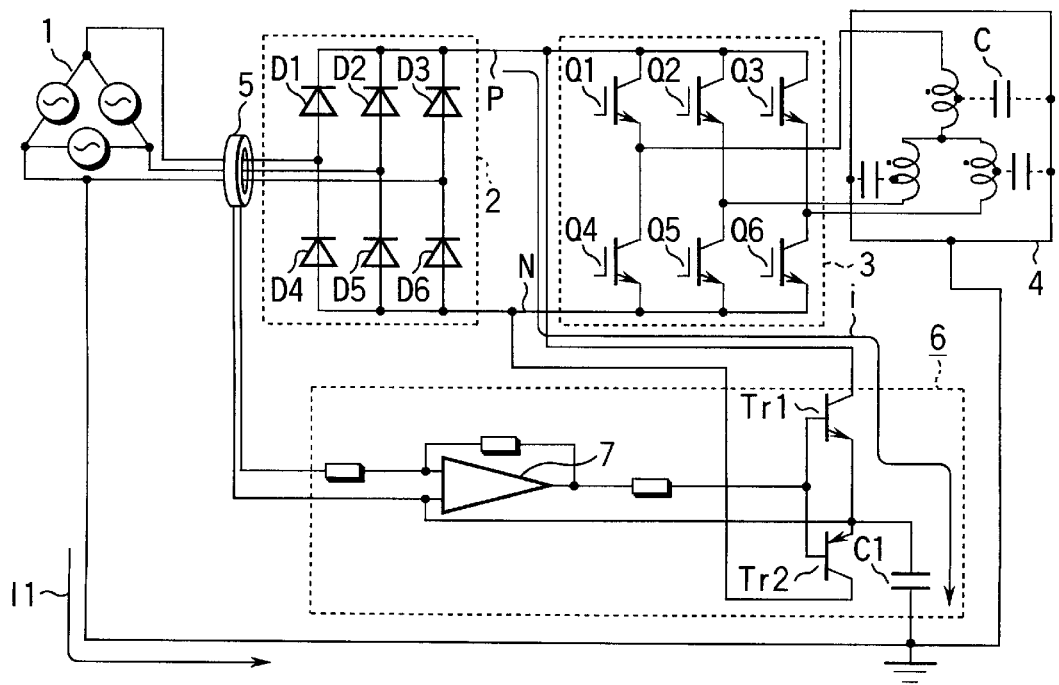
Figure 5:
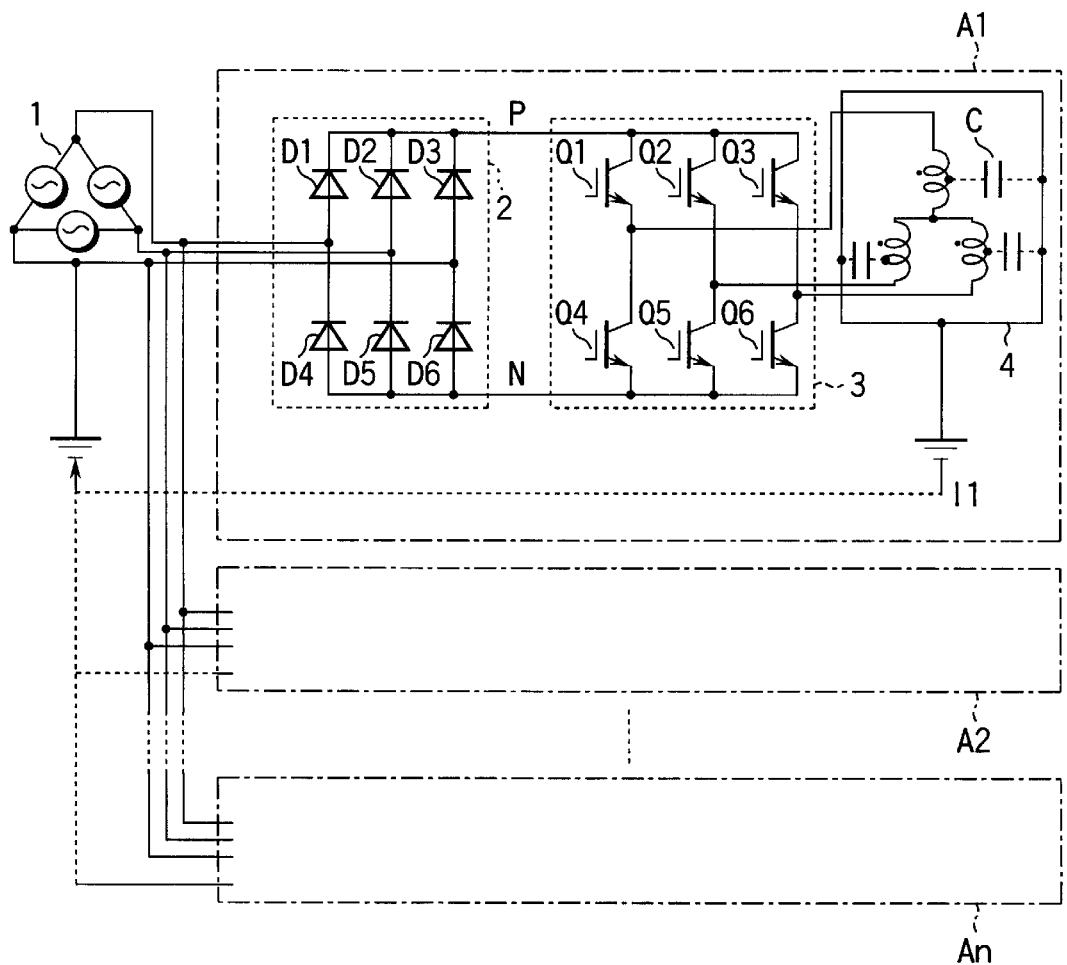
FIGS. 5 and 6 are schematic circuit diagrams of another known power conversion system and the peripheral arrangement.
Figure 6:
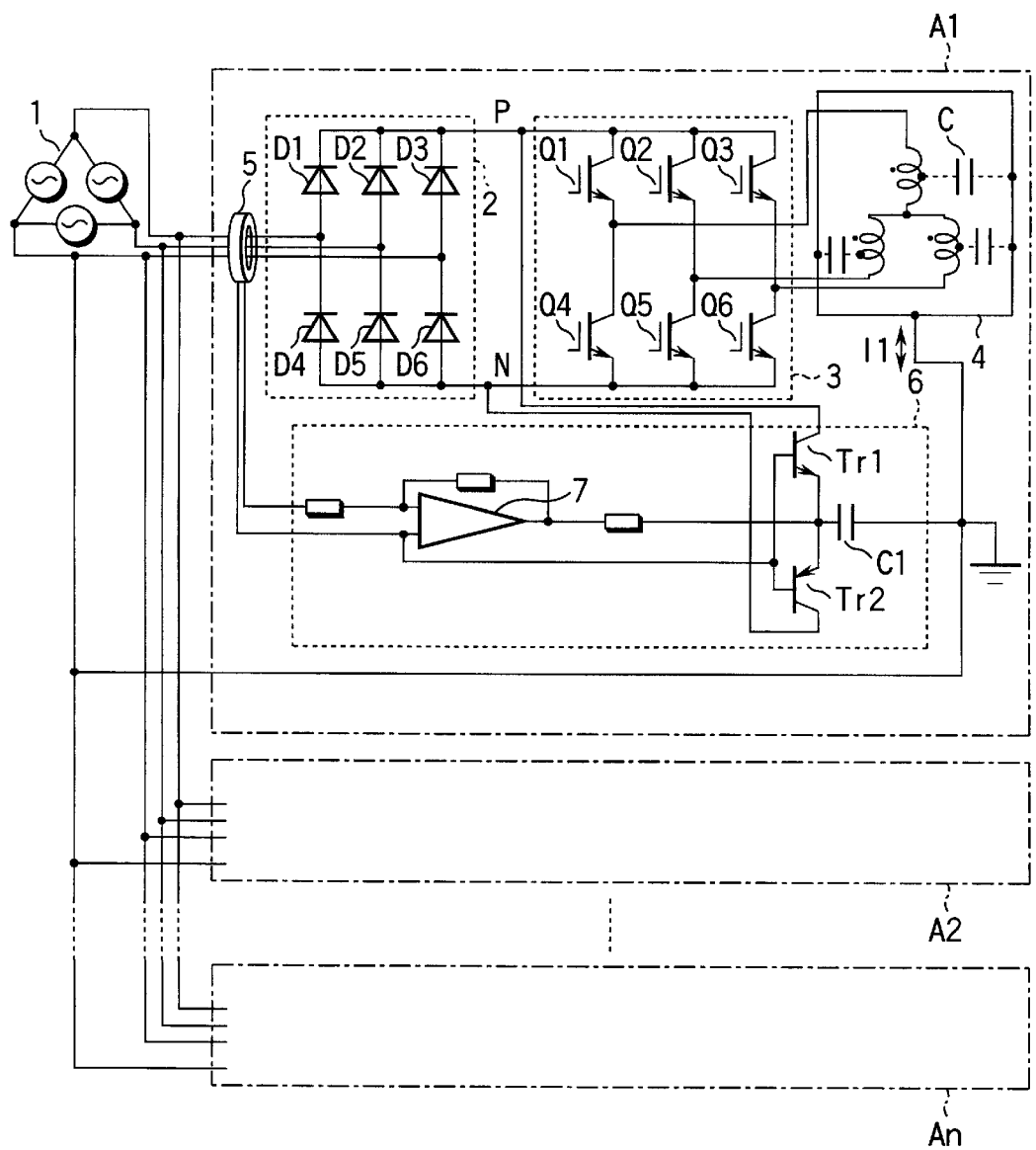
Figure 7:
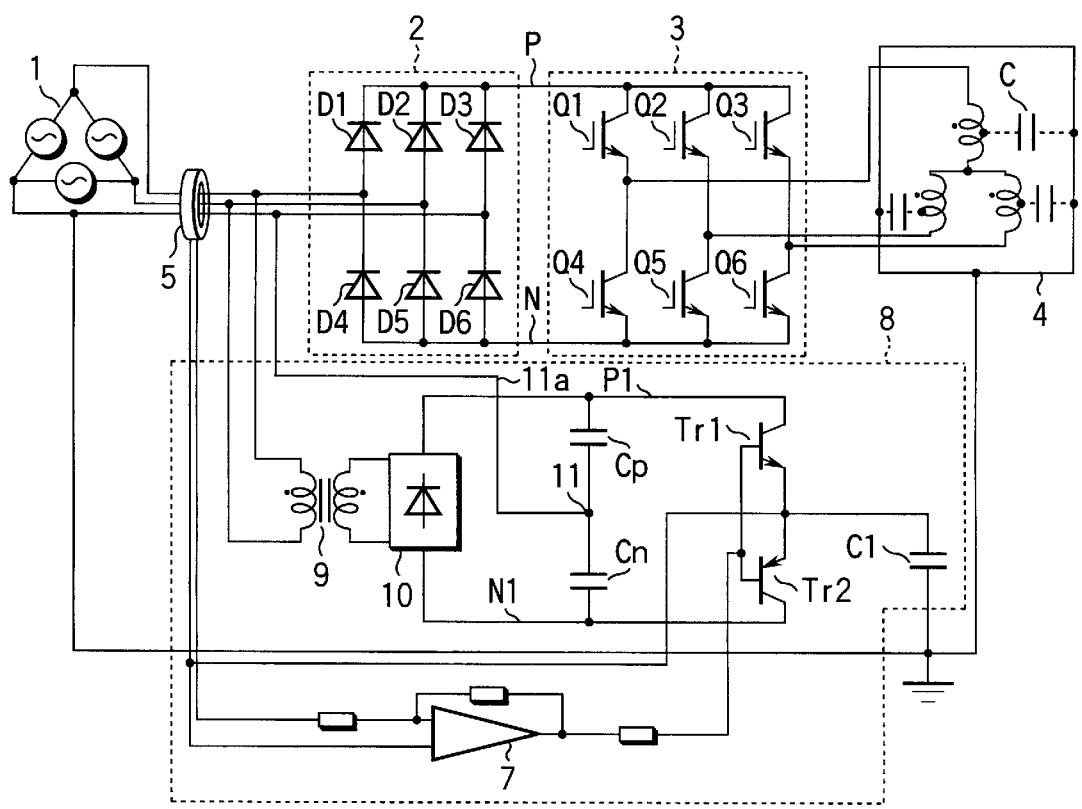
FIG. 7 is a schematic circuit diagram of a first embodiment of power conversion system according to the invention and the peripheral arrangement.

FIG. 7 is a schematic circuit diagram of a first embodiment of power conversion system according to the invention and the peripheral arrangement. In FIG. 7, the components same as or similar to those of FIG. 2 are denoted respectively by the same reference symbols and will not be described any further. Same is true for the other embodiments. Therefore, only the substance of the present invention will be described hereinafter.

This embodiment is designed to improve the controllability of a noise compensation current. More specifically, it comprises a noise reduction circuit 8 obtained by improving the known noise reduction circuit 6. The noise reduction circuit comprises an insulating transformer 9 and a rectifying circuit 10 for producing a potential difference between the collector of each of the transistors Tr1, Tr2 and the ground and capacitors Cp, Cn for flowing a noise compensation current i to and from the input grounding terminal of full-wave rectifier 2 depending on the on/off condition of the respective transistors Tr1, Tr2.

The insulating transformer 9 has its primary side connected to the supply line passing through the leakage current detector 5 and its secondary side connected to the rectifying circuit 10.

The rectifying circuit 10 operates for full-wave rectifying the output AC voltage of the secondary side of the insulating transformer 9 and supplying the obtained DC voltage to the npn-type transistor Tr1 and the pnp-type transistor Tr2 arranged between the positive side output line P1 and the negative side output line N1. More specifically, the rectifying circuit 10 has the positive side output line P1 connected to one of the opposite ends of the capacitor Cp and the collector of the npn-type transistor Tr1 and the negative side output line N1 connected to one of the opposite ends of the capacitor Cn and the collector of the pnp-type transistor Tr2.

To be more accurate, the positive side output line P1 of the rectifying circuit 10 is connected to the negative side output line N1 by way of the capacitors Cp and Cn having a same capacitance. The serial connection point (neutral point) 11 of the capacitors Cp and Cn is connected to the input grounding terminal of the full-wave rectifier 2 by way of the connection line 11a.

The power conversion system having the above described configuration operates in a manner as described below for noise reduction.

A DC voltage rectified for the full-wave is applied to the positive side output line P1 and the negative side output line N1 of the rectifying circuit 10 and the DC voltage is divided by the two capacitors Cp and Cn with the intermediary connection point 11 held to the ground potential.

As a result, the positive side output line P1 can always supply a positive voltage that is held to a constant level relative to the ground potential. Similarly, the negative side output line N1 can always supply a negative voltage that is held to a constant level relative to the ground potential. Thus, unlike the prior art, it is always possible to control the noise compensation current i.

To describe more accurately, in the noise reduction circuit 8, the transistors Tr1, Tr2 are turned on and off inversely relative to each other when they receives an output signal from the amplifier 9 at their bases to connect either the positive side output line P1 or the negative side output line N1 to the ground by way of the coupling capacitor C1.

Figure 8:
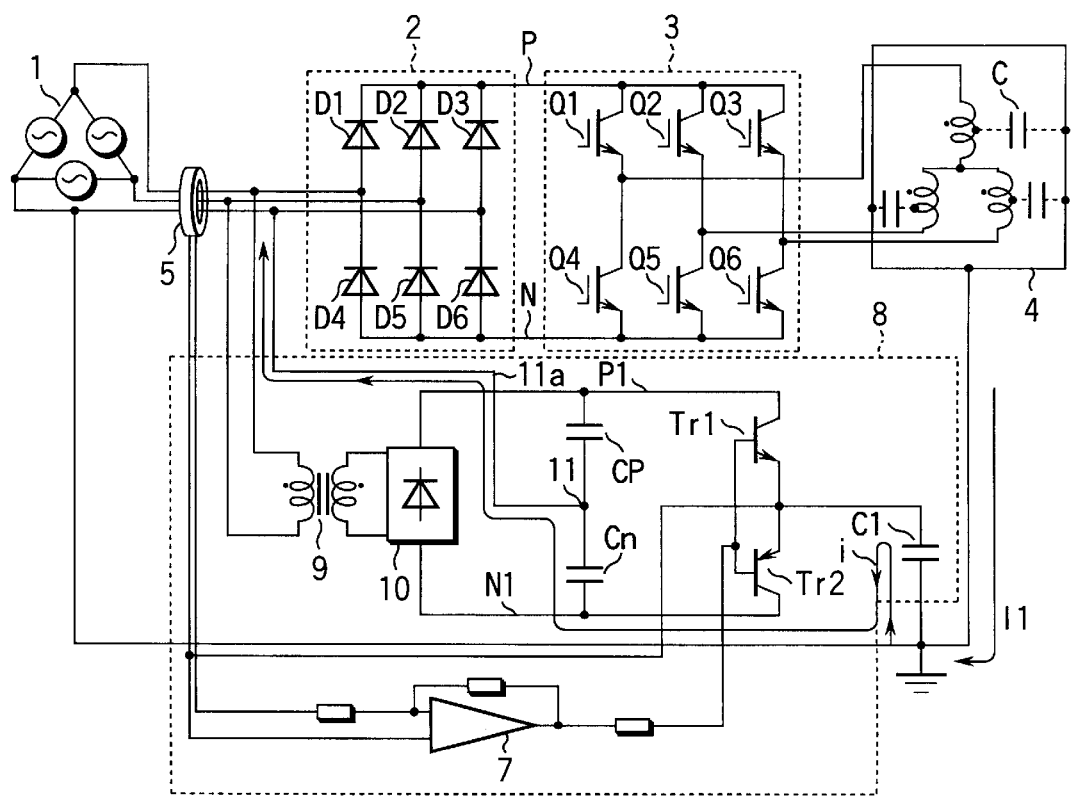
FIGS. 8 and 9 are schematic illustrations of the noise reducing operation of the first embodiment.

For instance, if a leakage current I1 flows into the grounding line of the AC power source 1 from the electric motor 4, the noise reduction circuit 8 turns on only the pnp-type transistor Tr2 as shown in FIG. 8.

Thus, the noise compensation current i flows into the input grounding terminal of the full-wave rectifier 2 through the coupling capacitor C1, the pnp-type transistor Tr2, the negative side output line N1 and the capacitor Cn.

Therefore, the leakage current I1 is cancelled by the noise compensation current i flowing into the grounding line of the AC power source 1.

Figure 9:
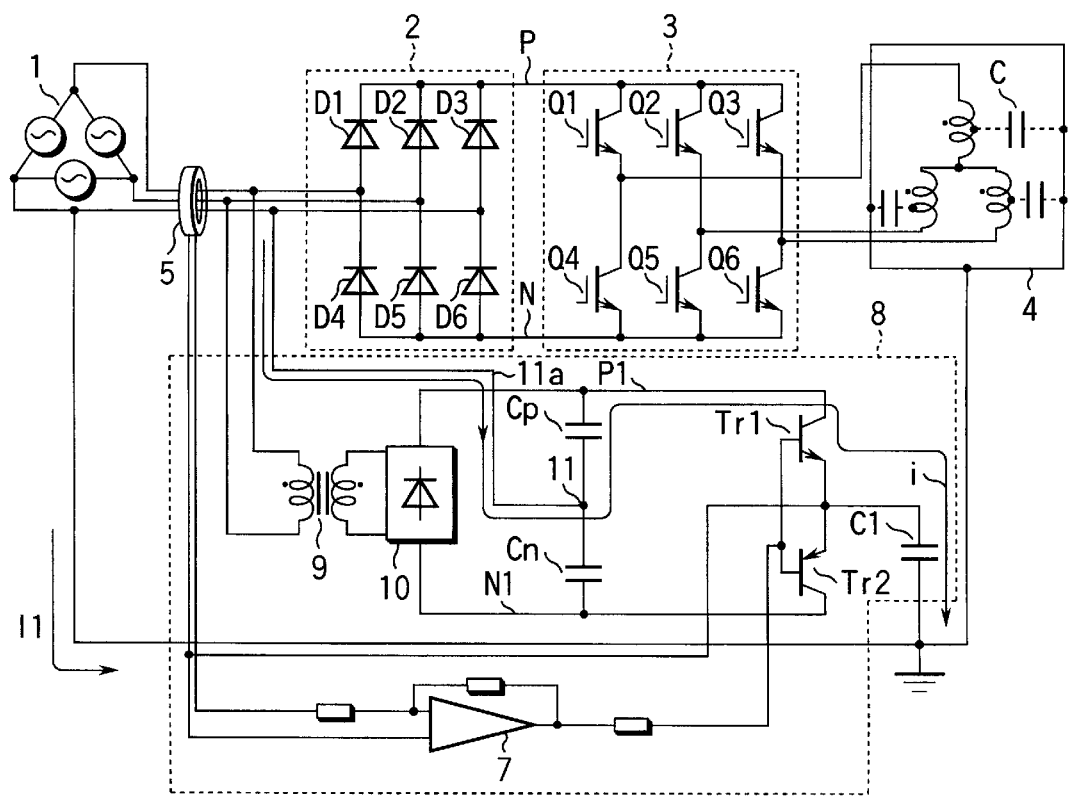

If, on the other hand, a leakage current I1 flows into the electric motor 4 from the grounding line of the AC power source 1, the noise reduction circuit 8 turns on only the npn-type transistor Tr1 as shown in FIG. 9.

Thus, the noise compensation current i flows into the grounding line from the input grounding terminal of the full-wave rectifier 2 through the capacitor Cp, the positive side output line P1, the npn-type transistor Tr1 and the coupling capacitor C1.

Therefore, the leakage current I1 is cancelled by the noise compensation current i flowing into the grounding line of the AC power source 1.

Figure 10A:
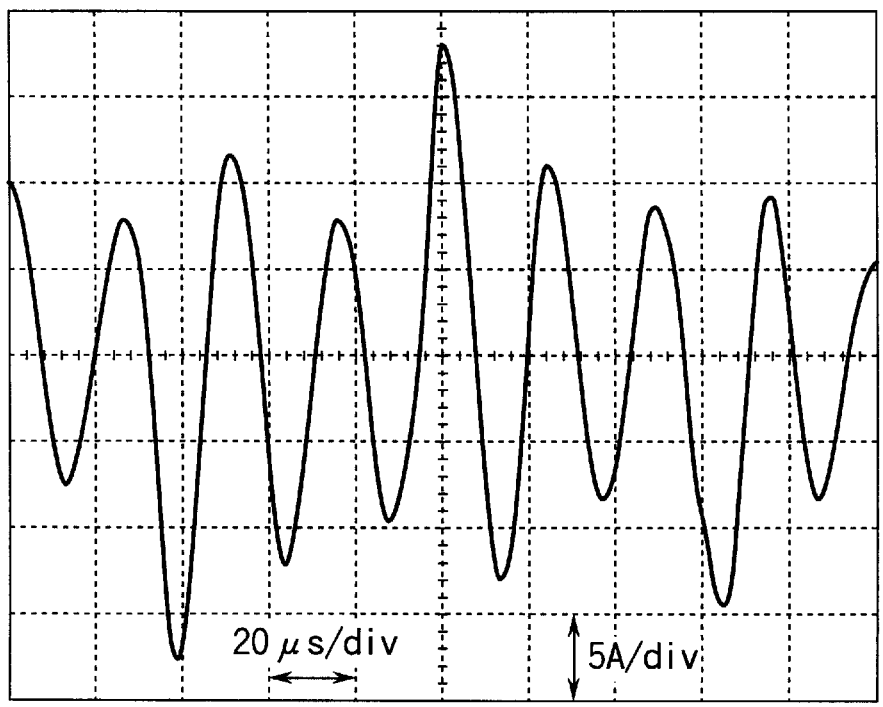
FIGS. 10A and 10B are waveforms illustrating the effect of the first embodiment.
Figure 10B:
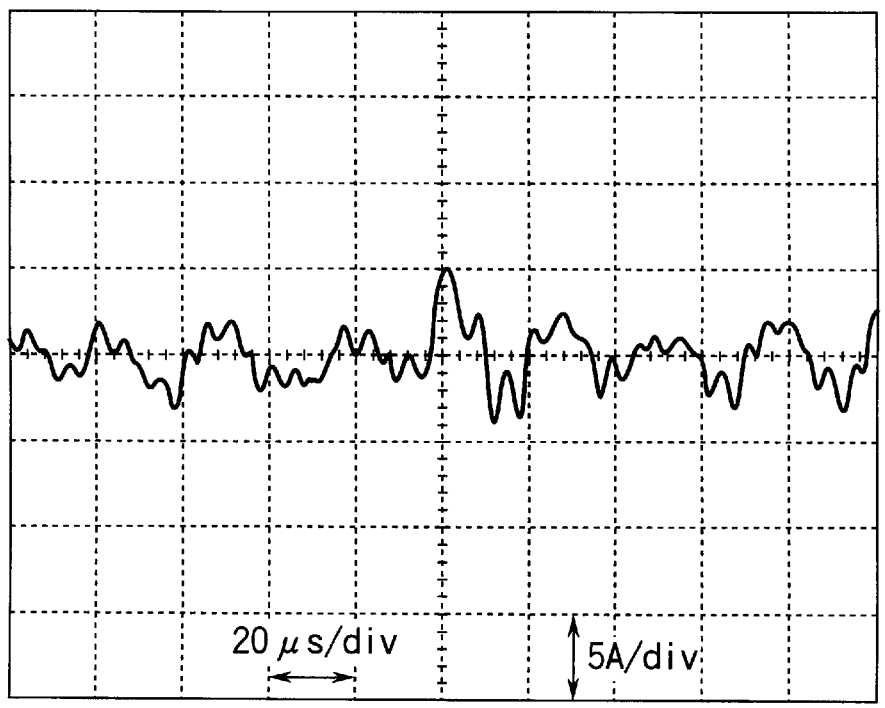

This effect of cancelling the leakage current I1 will be described by referring to the waveforms of FIGS. 10A and 10B, which represent a detection signal that can be output from the leakage current detector 5 when the electric motor 4 that is of the 100 kW class is driven. FIG. 10A shows a waveform that can be observed when the noise compensation current 8 is not in operation, whereas FIG. 10B shows a waveform that can be observed when the noise reduction circuit 8 is in operation. The vertical axis of each of FIGS. 10A and 10B represents an electric current of 5 A per division and the horizontal axis represents a time of 20 µs per division.

In this embodiment, it will be seen that the level of the detection signal for the leakage current I1 is significantly reduced in FIG. 10B if compared with its counterpart in FIG. 10A. In other words, the embodiment provides the advantage that it can significantly reduce the leakage current I1 as evidenced by the waveforms of FIGS. 10A and 10B.

With regard to this advantage, assume that this embodiment of power conversion system is installed to drive the electric motor of an elevator in a building. If the system does not comprise the noise reduction circuit 8, a leakage current I1 as shown in FIG. 10A will appear to disturb the entire grounding potential of the building. Then, all the electronic appliances in the building (e.g., card readers, automatic doors and automatic toilet flush system) can give rise to operation errors and nose can significantly appear on the display screen of the monitors in the building.

However, if the noise reduction circuit 8 of the embodiment is in place, the leakage current I1 is remarkably reduced as shown in FIG. 10B so that operation errors and appearance of noise can be effectively avoided. Additionally, since the embodiment can collectively reduce fluctuations of the ground potential of the entire building, it is no longer necessary to provide each of the electronic devices with an anti-error-operation measure in the building.

On the other hand, fluctuations of the ground potential of the entire building may conceivably be reduced by a conventional technique if the AC power source and the power converters are electrically insulated from each other by means of an insulating transformer. However, with such an arrangement, the capacity of the insulating transformer is raised and the space necessary for installing the insulating transformer is inevitably increased as a function of the capacity of the power converters.

To the contrary, the above embodiment is free from such a problem because it requires only a noise reduction circuit 8 that is a small capacity amplifier circuit to be arranged on a printed circuit board that takes only a small space.

As described above, with this embodiment, while a rectified DC voltage is applied to the positive side output line P1 and the negative side output line N1 of the rectifying circuit 10, the DC voltage is divided by the two capacitors Cp and Cn with the intermediary connection point 11 held to the ground potential so that the positive side output line P1 can always supply a positive voltage that is held to a constant level relative to the ground potential whereas the negative side output line N1 can always supply a negative voltage that is held to a constant level relative to the ground potential. Thus, a power conversion system according to the invention shows a remarkably improved controllability for the noise compensation current if compared with the prior art because the above supplied voltages can be held to a constant level relative to the ground potential.

Additionally, as the transistors Tr1, Tr2 are controlled for on/off operations by the amplifier 7, the noise compensation current i flows through the noise reduction circuit 8 between the input grounding terminal of the full-wave rectifier 2 and the ground to cancel the leakage current I1 that is a noise current and reliable reduce the noise level without difficulty.

Still additionally, the insulating transformer 9 insulates between the output lines P1, N1 of the noise reduction circuit 8 and the input lines P, N of the inverter 3. Thus, unlike the prior art, the noise reduction circuit 8 can flow a noise compensation current i if the elements D3, D4 (or D6, D1) of the rectifying circuit 3 are held in an electrically conductive state relative to each other.

Further more, because of the interposition of the insulating transformer 9, the electric potential relative to the ground can be selected without taking the voltage applied to the inverter 3 and the capacitance thereof. Thus, the elements of the embodiment are not required to show a high withstand voltage and hence commercially available current control elements such as npn-type transistors and pnp transistors may be used for the purpose of the invention. Such current control elements can be used to control a large noise compensation current i by means of a small signal output from the amplifier 7. In other words, the current control elements of this embodiment operate to provide a function equivalent to that of a linear high frequency amplifier adapted to control a large output power by means of a small signal. Thus, the embodiment is used to realize a small and inexpensive noise reducer having a simple configuration and a high speed control capability.

With the embodiment flows the noise compensation current i for cancelling the leakage current I1 at the side of the full-wave rectifier 2 rather than at the side of the leakage current detector 5 in order not to interfere with the leakage current detecting operation of the leakage current detector 5.

In other words, because the leakage current detector 5 is arranged close to the AC power source 1 relative to the serial connection point 11 of the AC input line of the full-wave rectifier 2, the leakage current, if any, can be detected independently from the flow of the noise compensation current i in the AC input line of the full-wave rectifier 2 to improve the reliability of operation.

Note that the fixed resistor connected in parallel to the amplifier 7 may be replaced by a variable resistor connected in parallel thereto in order to made the amplification gain of amplifier 7 adjustable. This modifiability is applicable to all the embodiments that will be described hereinafter.

Figure 11:
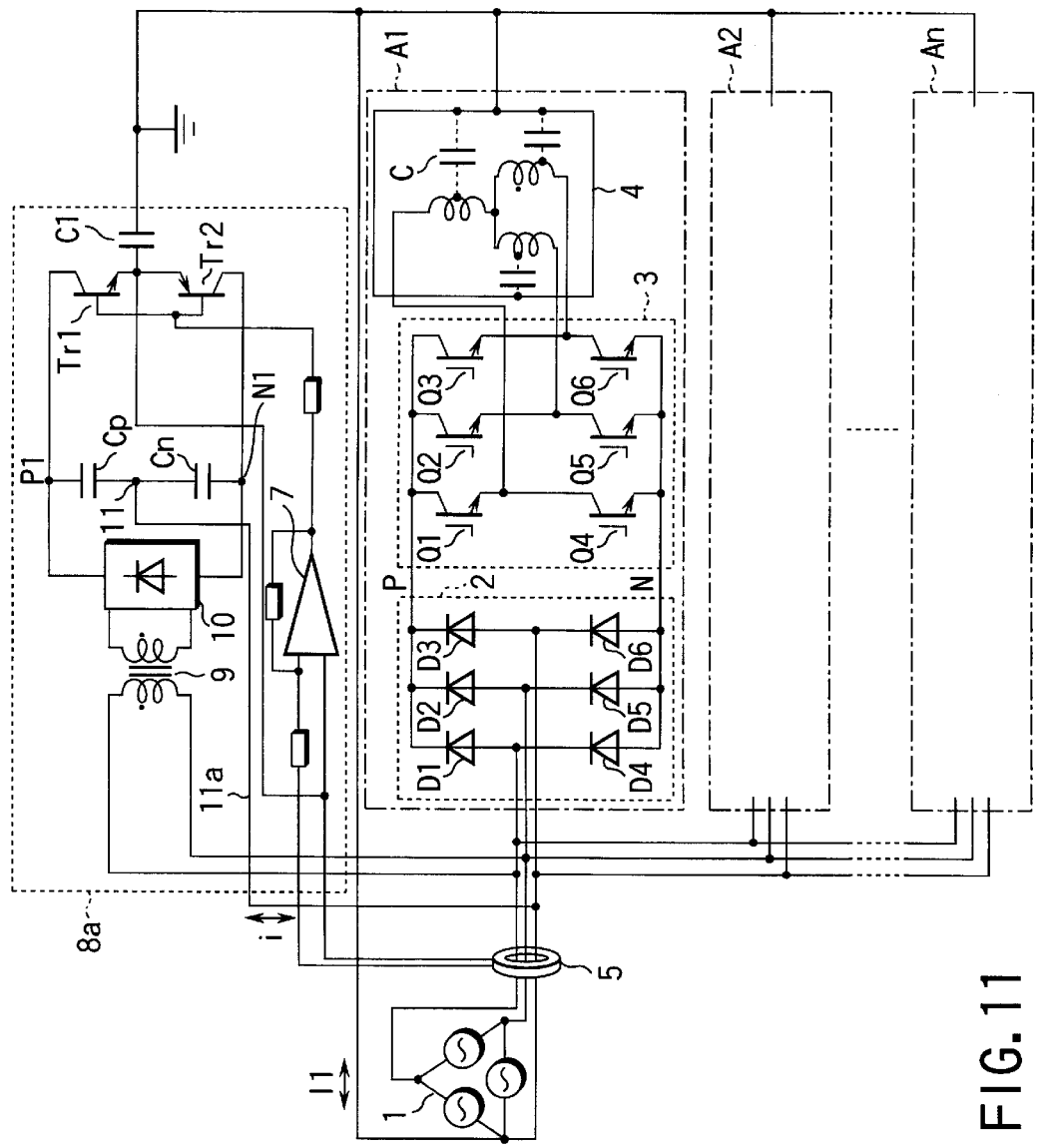
FIG. 11 is a schematic circuit diagram of a power conversion system obtained by modifying the first embodiment.

As shown in FIG. 11, the embodiment may be so modified as to comprise a plurality of power converters connected in parallel. Then, the operation of extracting an AC voltage of the insulating transformer 9 and that of flowing in/out a noise reduction circuit i of the noise reduction circuit are conducted relative to the common AC input line. Then, the connection points of the noise reduction circuit are excluded from the power converters and collectively arranged to the upstream thereof so that this arrangement provides an advantage of commonly using the noise reduction circuit in addition to the above identified noise reduction effect. In other words, the noise of driving the system can be reduced by means of a common noise reduction circuit to a great advantage of down-sizing the system.

2nd Embodiment

Figure 12:
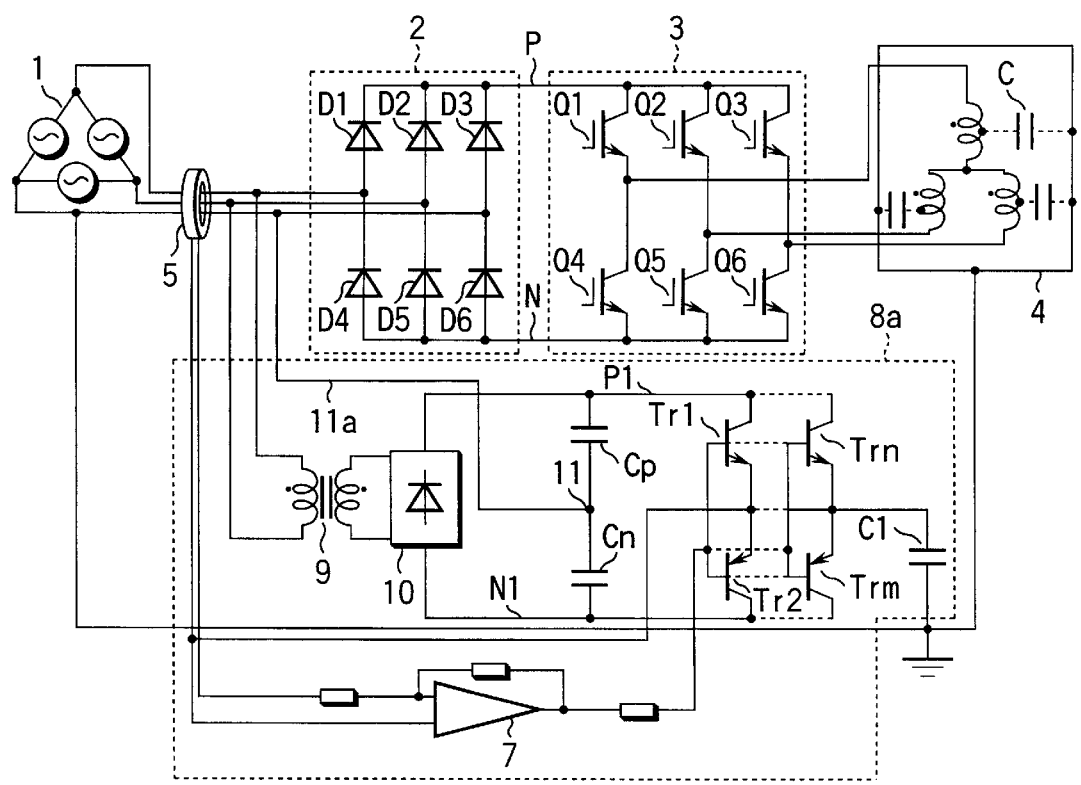
FIG. 12 is a schematic circuit diagram of a second embodiment of power conversion system according to the invention and the peripheral arrangement.
Figure 13:
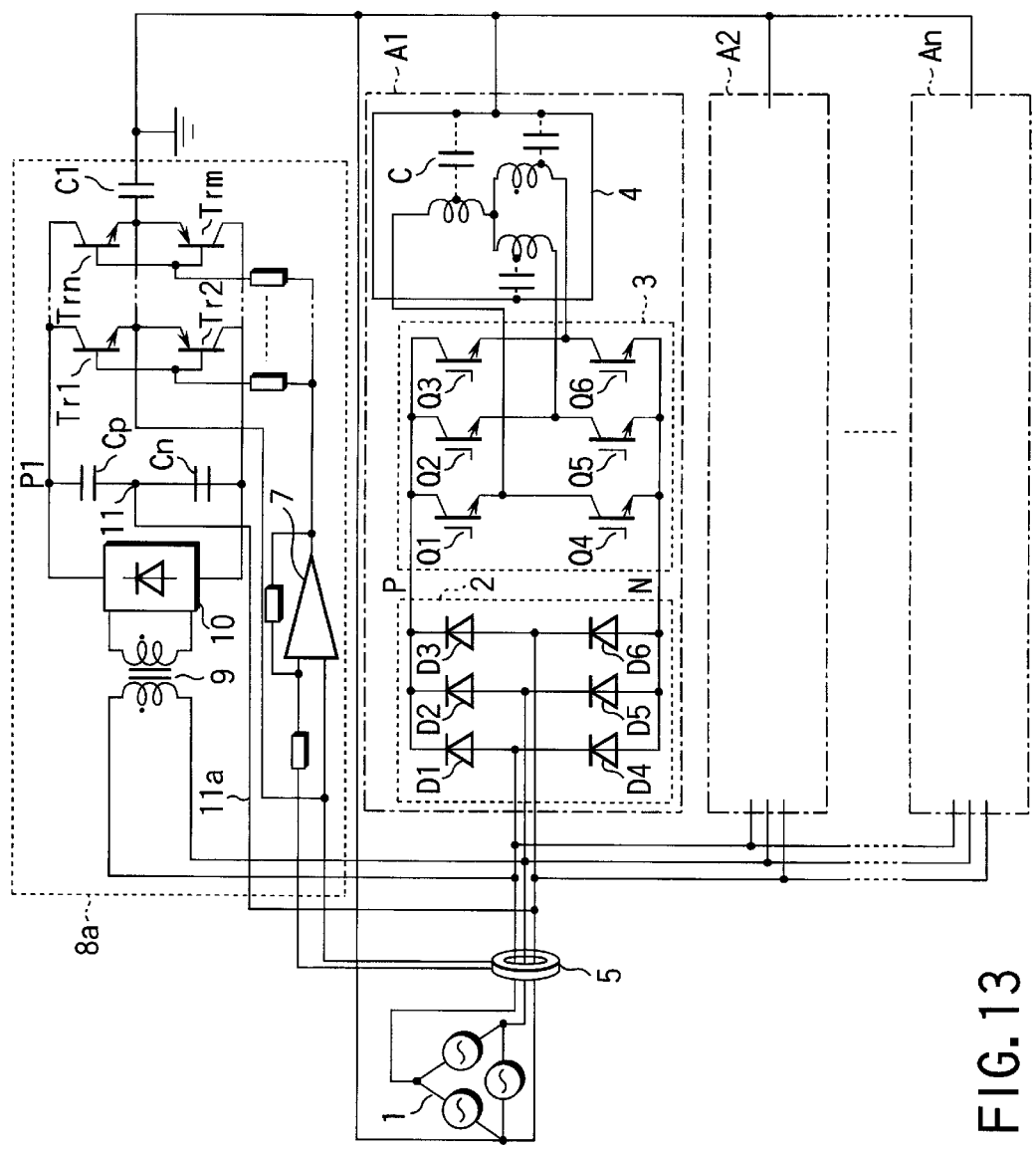
FIG. 13 is a schematic circuit diagram of a power conversion system obtained by modifying the second embodiment.

FIG. 12 is a schematic circuit diagram of a second embodiment of power conversion system according to the invention and the peripheral arrangement.

This embodiment is realized by modifying the first embodiment so as to make it adapted to control a large noise compensation current i in order to compensate a large leakage current I1. More specifically, in the noise reduction circuit 8a of this embodiment, the number of component series circuits, each comprising an npn-type transistor Tr1 and a npn-type transistor Tr2, is increased and the series circuits are electrically connected in parallel. Note that the number of the series circuit that are connected in parallel is proportional to the leakage current and may be selected appropriately depending on the situation.

With the above arrangement, again, since the parallel circuits of a plurality of npn-type transistors Tr1 through Trn and the parallel circuits of a plurality of pnp-type transistors Tr2 through transmitter show a large current capacity, a large noise compensation current i sufficient to cancel a large leakage current I1 can be made to flow.

Note that the electric current that can be made to flow to each of the transistors Tr1, Tr2 is limited by the rated current of each of the transistors Tr1, Tr2. However, current control elements such as transistors capable of controlling a high frequency are generally adapted only to a low voltage and a low current capacity. If current control elements adapted to a high voltage and a high current capacity are prepared, they will find only limited applications and hence can be manufactured only at high cost.

However, with this embodiment of the invention where a desired level of voltage can be selected by means of the insulating transformer 9, the transistors Tr1, Tr2 can be connected in parallel to increase the current capacity regardless of the voltage.

This embodiment can be modified to comprise a plurality of power converters that are connected in parallel. Then, the modified embodiment can also be down-sized by using a common noise reduction circuit.

3rd Embodiment

A power conversion system according to the invention may be applied to an AC power source having a star-connection. Firstly, the technological background of such an arrangement will be discussed below.

If the first embodiment is simply applied to an AC power source having a star-connection, there arises a problem that a noise compensation current i for cancelling noise cannot be made to flow because the neutral point of the star-connection is grounded and the AC power source having a star-connection does not have any supply line having a grounding line. On the other hand, a 3-phase 4-line type power source is required to return the leakage current flowing to the power source grounding terminal back to the neutral point and compensate the leakage current.

Thus, there arises a problem that a cost of systems will be increase because using a 4-line type wiring or NFB(negative feedback).

This embodiment is designed to solve the above problem. To explain the design concept underlying the embodiment, a simple arrangement of combining a power converter and an electric motor 4 will be discussed first by referring to FIG. 14 and then the argument will be applied to a power conversion system comprising a plurality of combinations of a power converter and an electric motor 4.

Figure 14:
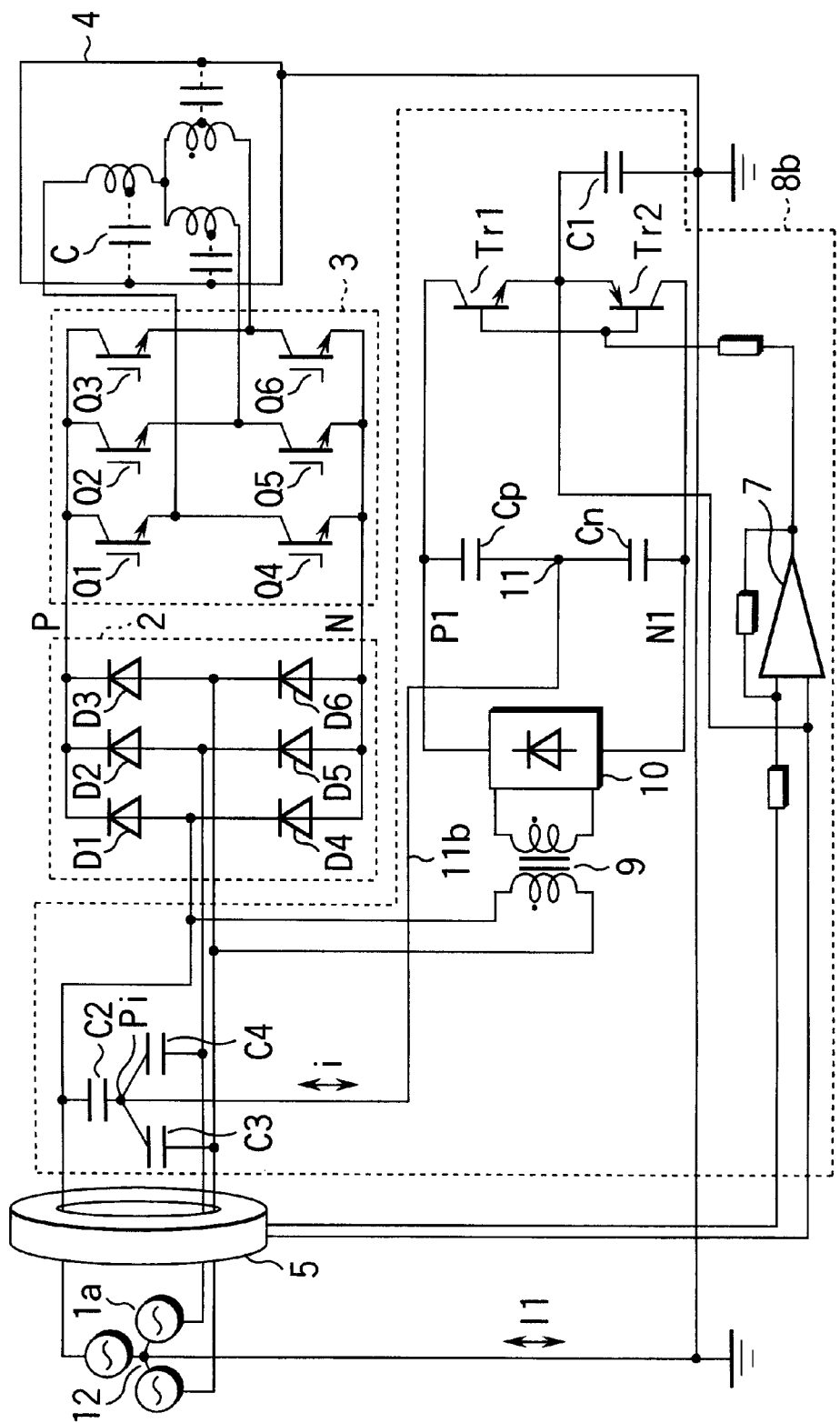
FIG. 14 is a schematic circuit diagram of a third embodiment of power conversion system according to the invention and the peripheral arrangement.

FIG. 14 is a schematic circuit diagram of a third embodiment of power conversion system according to the invention and the peripheral arrangement.

As shown, the AC power source 1 of the preceding embodiments is replaced by an AC power source 1a having a star-connection with its neutral point 12 grounded and three capacitors C2 through C4 of the star-connection, each having one of its end connected independently to the corresponding one of the 3-phase AC input lines between the leakage current detector 5 and the full-wave rectifier 2 and the other end connected to the neutral point Pi. The neutral point P1 of the capacitors C2 through C4 is connected to the series contact point 11 of the capacitors Cp, Cn in the noise reduction circuit 8b.

With the above arrangement, the three capacitors C2 through C4 connected equivalently relative to the AC power source 1a having a star-connection are then connected to the 3-phase AC input line. Note that the neutral point Pi of the star-connected capacitors C2 through C4 is a virtual grounding point that corresponds to the neutral point 12 that is the grounding connection point of the star-connected AC power source 1a.

Then, the series connection point 11 of the capacitors Cp, Cn of the noise reduction circuit 8b is connected to the virtual grounding point by way of the connection line 11b. Thus, while a DC voltage rectified for the full-wave is applied to the positive side output line P1 and the negative side output line N1 of the rectifying circuit 10, the DC voltage is divided with the intermediary series connection point 11 held to the potential of the virtual grounding point (neutral point Pi) by the two capacitors Cp, Cn.

Thus, as in the case of the preceding embodiments, that it is possible to always the positive side output line P1 can always supply a positive voltage that is held to a constant level relative to the potential of the virtual grounding point whereas the negative side output line N1 can always supply a negative voltage that is held to a constant level relative to the potential of the virtual grounding so keep the noise compensation current i under control.

More specifically, the noise compensation current i flows into or out from the AC input line by way of the series connection point 11 of the capacitors Cp, Cn of the noise reduction circuit 8b and the neutral point present invention of the star-connected three capacitors C2 through C4 depending on the on/off states of the transistors Tr1, Tr2. Therefore, the leakage current I1 is effectively cancelled as any of the preceding embodiments.

As described above, the third embodiments provides an effect similar to that of the first embodiment for a star-connected AC power source 1a as star-connected three capacitors C2 through C4 are arranged on the 3-phase AC input line and the neutral point P1 of the capacitors C2 through 3 is connected as virtual grounding point to the series connection point 11 of the capacitors Cp, Cn of the noise reduction circuit 8b.

Figure 15:
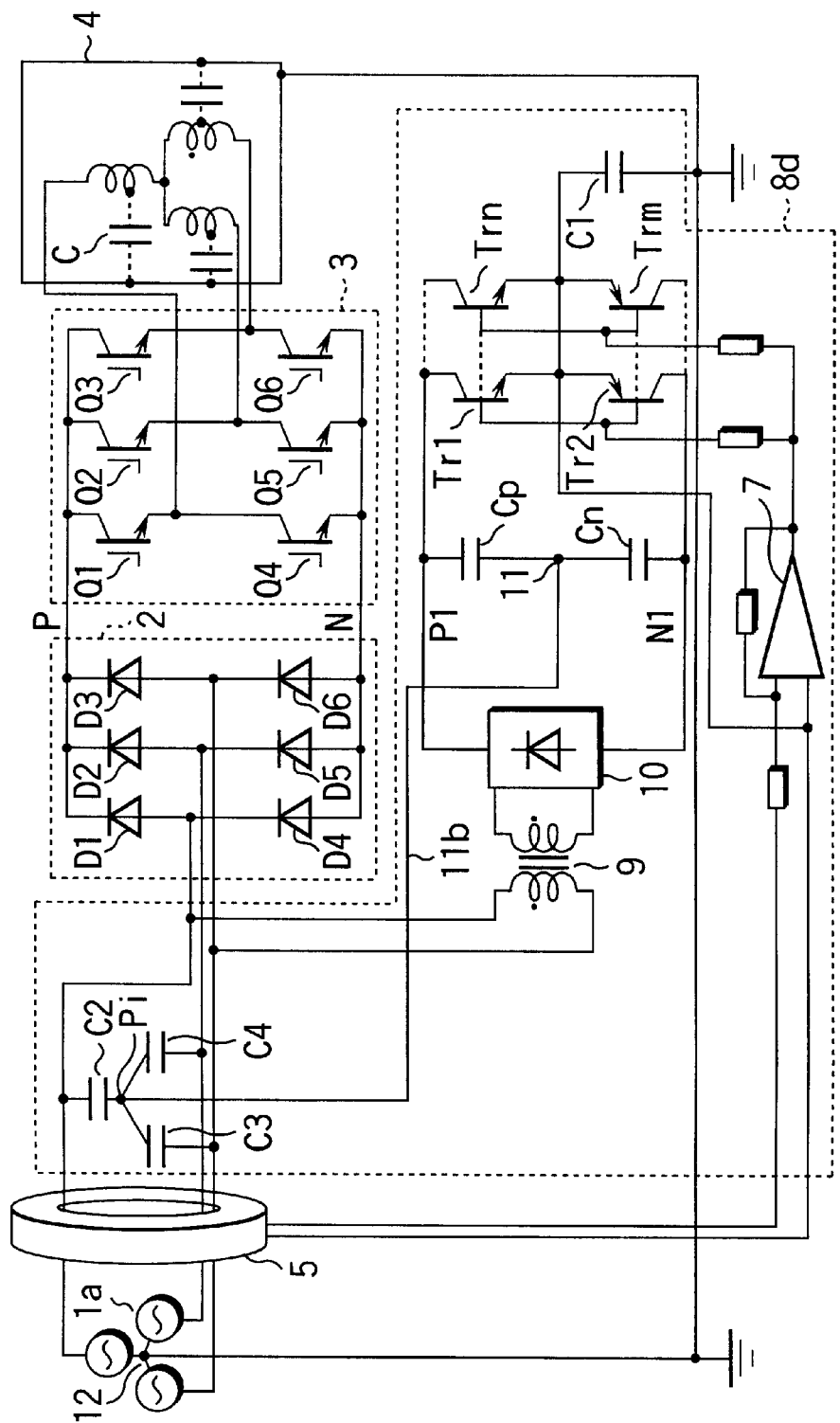
FIGS. 15 through 17 are schematic circuit diagrams of power conversion systems obtained by modifying the third embodiment.
Figure 16:
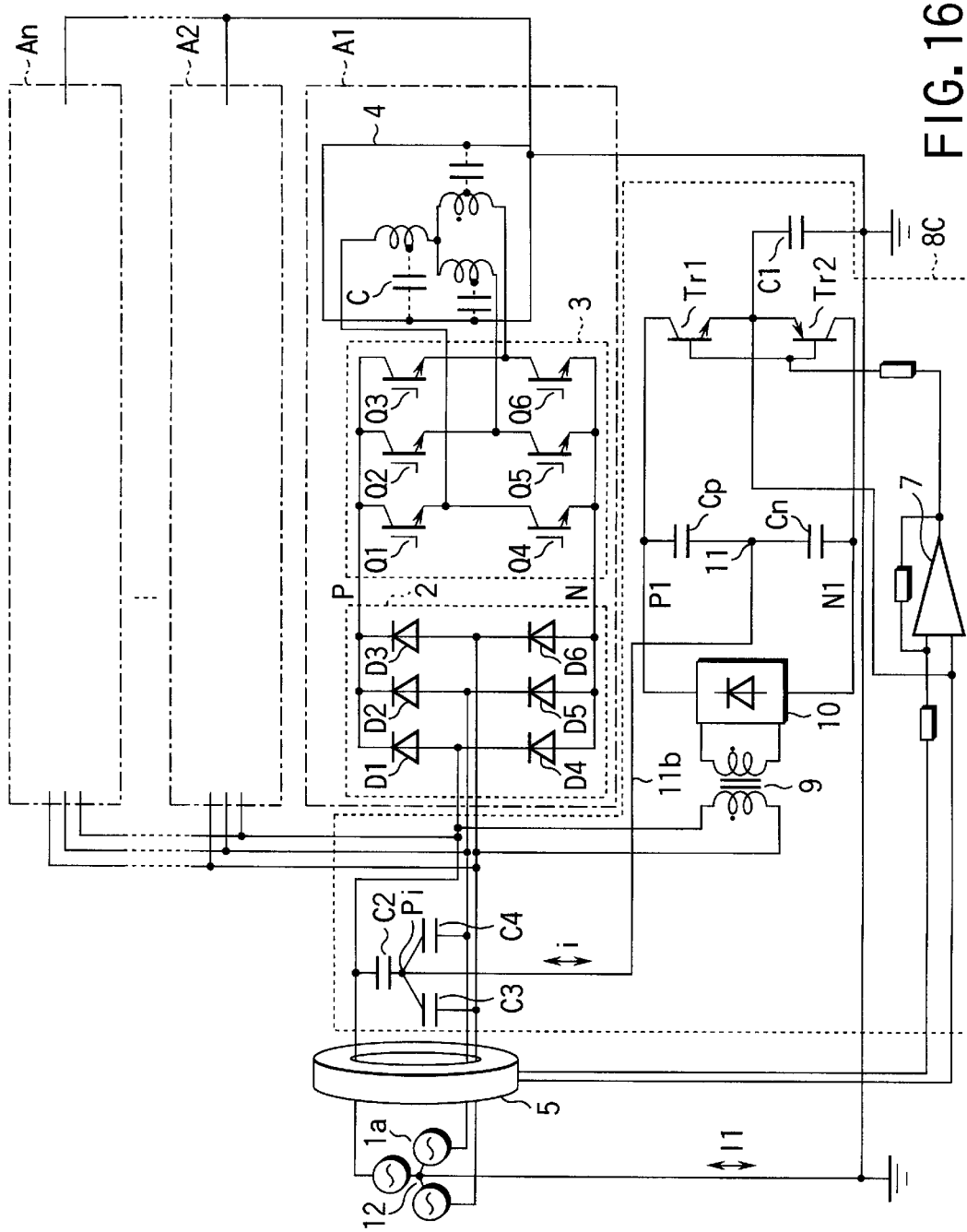
Figure 17:
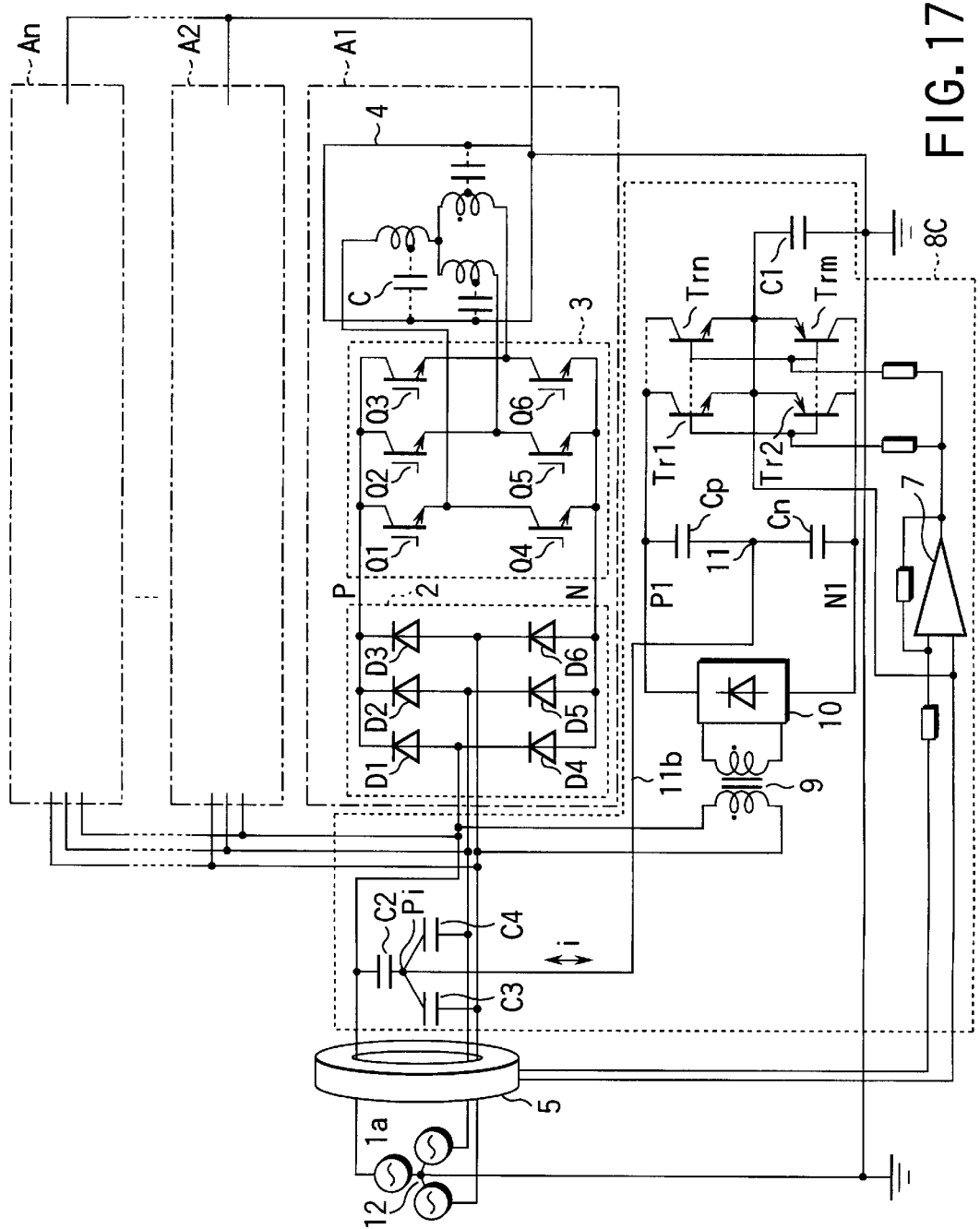

This embodiment can be modified by increasing the component series DC circuits of two transistors Tr1, Tr2 that are connected in parallel with each other to control a large noise compensation current i as in the case of the second embodiment, as shown in FIG. 15. Alternatively, the third embodiment can also be modified in such a way that a plurality of inverters are connected in parallel as in the case of the second embodiment, as shown in FIGS. 16 and 17.

4th Embodiment

Figure 18:
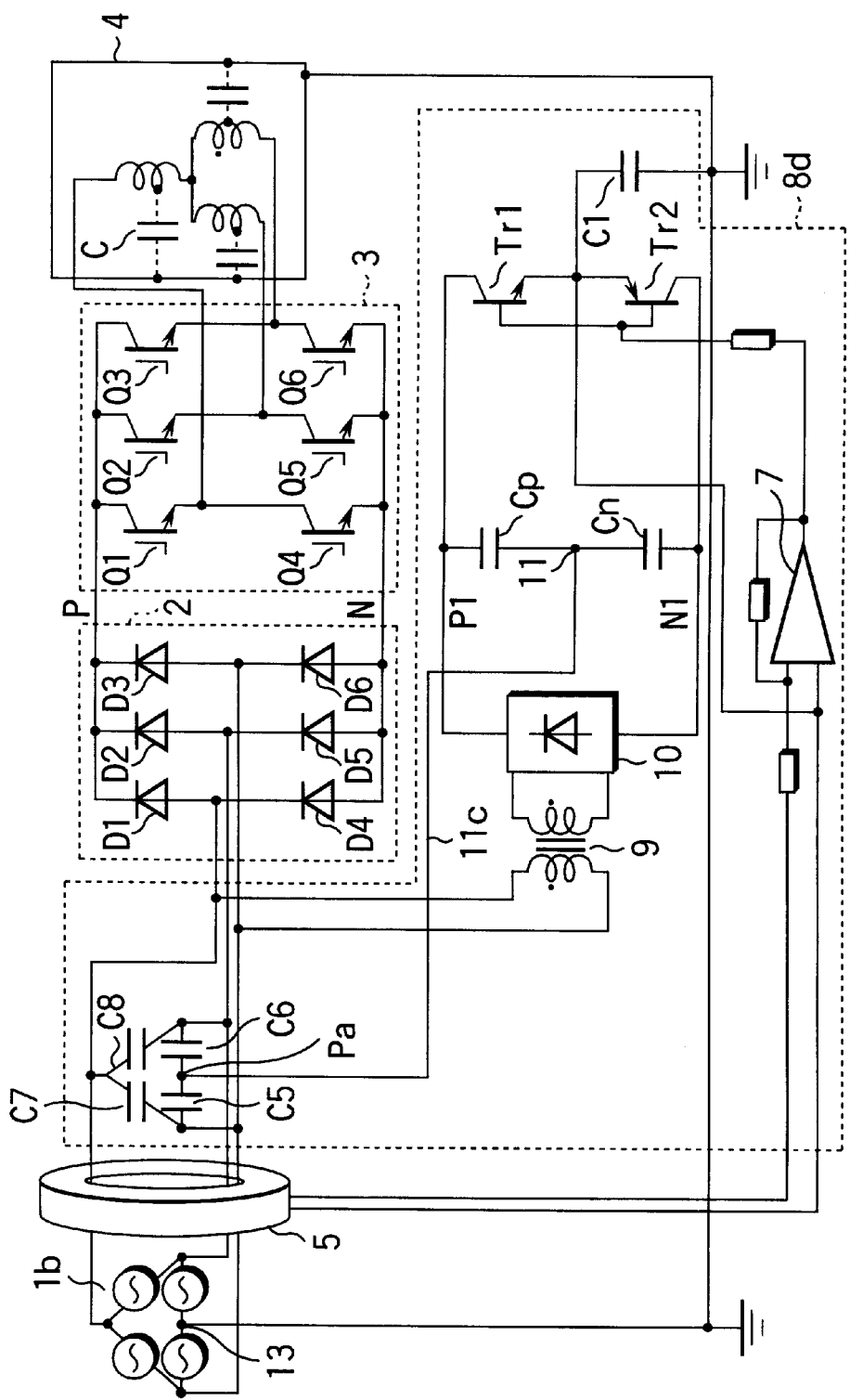
FIG. 18 is a schematic circuit diagram of a fourth embodiment of power conversion system according to the invention and the peripheral arrangement.

FIG. 18 is a schematic circuit diagram of a forth embodiment of power conversion system according to the invention and the peripheral arrangement.

This embodiment is realized by modifying the third embodiment and the concept underlying the third embodiment is applied to all the AC power sources having respective grounding points that are not connected to the supply line.

More specifically, the AC power source 1a is replaced by a 3-phase delta-connected AC power source 1b that is grounded at the neutral point 13 of two phases and four delta-connected capacitors C5 through C8 connected to the 3-phase AC input line between the leakage current detector 5 and the full-wave rectifier 2 equivalently relative to the AC power source 1b. With this arrangement, the neutral point Pa of the capacitors is the connection point of C5 and C6 arranged equivalently relative to the grounding terminal of the AC power source 1b, which is connected to the series connection point 11 in the noise reduction circuit 8d by way of the connection line 11c as in the case of the preceding embodiment.

With the above arrangement, four capacitors C5 through C8 that are delta-connected equivalently relative to the AC power source 1b having four delta-connected AC power source sections are connected to the 3-phase AC input line. The neutral point Pa of the delta-connected capacitors C5 through C8 operate as virtual grounding point that corresponds to the neutral point 13 between two power source sections that is the ground connection point of the delta-connected AC power source 1b.

The serial connection point 11 of the capacitors Cp and Cn in the noise reduction circuit 8d is connected to the virtual grounding point (Pa).

Thus, the above arrangement of 3-phase delta-connected AC power source 1b grounded at the neutral point 13 of two phases also provides the advantage of the third embodiment.

The arrangement of this embodiment of (1) providing a plurality of capacitors C5 through C8 connected equivalently relative to the AC power source 1b and (2) connecting the neutral point Pa of the capacitors C5 through C8 (virtual grounding point corresponding to the grounding connection point of the AC power source 1b) to the series connection point 11 of the capacitors Cp, connection of the noise reduction circuit 8d can be applied not only to the AC power source 1a of the third embodiment or the AC power source 1b of the fourth embodiment but also to any AC power source having a grounding terminal not connected to the supply line.

Additionally, while not specifically illustrated, this embodiment may be modified so as to have a plurality of DC component circuits of Tr1, Tr2 as shown in FIG. 15, a plurality of inverters 3 connected in parallel as shown in FIG. 16 or both of them as shown in FIG. 17 to provide a similar advantage.

Other Embodiments

While each of the above embodiment comprises one or more than one npn-type transistors Tr1 and one or more than one pnp-type transistors Tr2 operating as so many elements for controlling the noise compensation current i, the transistors Tr1, Tr2 may be replaced by other elements for controlling an electric current that meet the requirements of having a high withstand voltage and operating at a high frequency to produce a high current amplifying effect to provide the above described advantage of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion system comprising:

an AC power source;

a power converter for converting an AC power supplied from said AC power source into an AC power with a selected frequency in order to individually drive an electric motor; and a noise reduction circuit for detecting a leakage current from a supply line of said AC power source, if any, and flowing a noise compensation current to said supply line of said AC power source;

said noise reduction circuit having:

an insulating transformer having its primary side connected between said AC power source and said power converter;

a rectifying circuit connected to a secondary side of said insulating transformer;

positive side and negative side capacitors connected in series between a positive output line and a negative side output line of said rectifying circuit;

a connection means for connecting a serial connection point between said positive side and negative side capacitors to a grounded common AC input line arranged upstream relative to said power converter;

a positive side switching device having one of its end connected to said positive output line;

a negative side switching device having one of its ends connected to said negative side output line and having an ON/OFF characteristic opposite to that of said positive side switching device;

a coupling capacitor arranged between the other ends of said positive side and negative side switching devices and the ground; and a switching control means for amplifying a detection signal of said leakage current and applying an obtained amplified signal to the control inputs of said positive side and negative side switching devices.

2. A power conversion system according to claim 1, further comprising:

a leakage current detector arranged closer to said AC power source than a connection point of said connection means and said AC input line and adapted to equivalently detect said leakage current, if any, and input said obtained detection signal to said switch control means.

3. A power conversion system according to claim 1, wherein said AC power source has multi-phase power source sections and one of the multi-phase power source sections is grounded.

4. A power conversion system according to claim 1, wherein each of the positive side and the negative side switching devices have a plurality of switching elements electrically connected in parallel.

5. A power conversion system comprising:

a common AC power source;

a plurality of power converters for converting an AC power supplied from said common AC power source into an AC power with a selected frequency in order to individually drive an electric motor; and a noise reduction circuit for detecting a leakage current from a supply line of said common AC power source, if any, and flowing a noise compensation current to said supply line of said common AC power source;

said noise reduction circuit having:

an insulating transformer having its primary side connected between said common AC power source and said power converters;

a rectifying circuit connected to a secondary side of said insulating transformer;

positive side and negative side capacitors connected in series between a positive output line and a negative side output line of said rectifying circuit;

a connection means for connecting a serial connection point between said positive side and negative side capacitors to a grounded common AC input line arranged upstream relative to said power converters;

a positive side switching device having one of its end connected to said positive output line;

a negative side switching device having one of its ends connected to said negative side output line and having an ON/OFF characteristic opposite to that of said positive side switching device;

a coupling capacitor arranged between the other ends of said positive side and negative side switching devices and the ground; and a switching control means for amplifying a detection signal of said leakage current and applying an obtained amplified signal to the control inputs of said positive side and negative side switching devices.

6. A power conversion system according to claim 5, further comprising:

a leakage current detector arranged closer to said common AC power source than a connection point of said connection means and said AC input line and adapted to equivalently detect said leakage current, if any, and input said obtained detection signal to said switch control means.

7. A power conversion system according to claim 5, wherein said common AC power source has multi-phase power source sections and one of the multi-phase power source sections is grounded.

8. A power conversion system according to claim 5, wherein each of the positive side and the negative side switching devices have a plurality of switching elements electrically connected in parallel.

9. A power conversion system comprising:

a star-connected AC power source having a grounded neutral point;

a power converter for converting an AC power supplied from said AC power source into an AC power with a selected frequency in order to individually drive an electric motor; and a noise reduction circuit for detecting a leakage current from a supply line of said AC power source, if any, and flowing a noise compensation current to said supply line of said AC power source;

said noise reduction circuit having:

an insulating transformer having its primary side connected between said AC power source and said power converter;

a rectifying circuit connected to a secondary side of said insulating transformer;

positive side and negative side capacitors connected in series between a positive output line and a negative side output line of said rectifying circuit;

capacitors for star-connection, each having one of its ends connected independently to said AC input line arranged upstream relative to said power converter and the other end connected to a common neutral point;

a connection means for connecting said neutral point of said capacitors for star-connection to the serial connection point between said positive side and negative side capacitors to a grounded common AC input line arranged upstream relative to said power converters;

a positive side switching device having one of its end connected to said positive output line;

a negative side switching device having one of its ends connected to said negative side output line and having an ON/OFF characteristic opposite to that of said positive side switching device;

a coupling capacitor arranged between the other ends of said positive side and negative side switching devices and the ground; and a switching control means for amplifying a detection signal of said leakage current and applying an obtained amplified signal to the control inputs of said positive side and negative side switching devices.

10. A power conversion system according to claim 9, further comprising:

a leakage current detector arranged closer to said AC power source than a connection point of said connection means and said AC input line and adapted to equivalently detect said leakage current, if any, and input said obtained detection signal to said switch control means.

11. A power conversion system according to claim 9, wherein said AC power source has multi-phase power source sections and one of the multi-phase power source sections is grounded.

12. A power conversion system according to claim 9, wherein each of the positive side and the negative side switching devices have a plurality of switching elements electrically connected in parallel.

* * * * *